US011703977B2

(12) United States Patent
Hirose et al.

(10) Patent No.: US 11,703,977 B2
(45) Date of Patent: Jul. 18, 2023

(54) CONTROL DEVICE, OPERATIONAL DEVICE, AND SYSTEM

(71) Applicant: KABUSHIKI KAISHA TOKAI RIKA DENKI SEISAKUSHO, Aichi (JP)

(72) Inventors: Fumiaki Hirose, Aichi (JP); Yasutaka Matsuda, Aichi (JP); Takeshi Ohnishi, Aichi (JP); Kunitoshi Noguchi, Aichi (JP); Shogo Yamaguchi, Aichi (JP); Takuma Fukuda, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 18/073,071

(22) Filed: Dec. 1, 2022

(65) Prior Publication Data

US 2023/0176677 A1 Jun. 8, 2023

(30) Foreign Application Priority Data

Dec. 6, 2021 (JP) .................................. 2021-197796

(51) Int. Cl.
 *G06F 3/041* (2006.01)
 *G06F 3/0362* (2013.01)
(52) U.S. Cl.
 CPC .......... *G06F 3/0416* (2013.01); *G06F 3/0362* (2013.01)

(58) Field of Classification Search
None
See application file for complete search history.

(56) References Cited

U.S. PATENT DOCUMENTS

2021/0240321 A1\* 8/2021 Shiga .................... G06F 3/0418

FOREIGN PATENT DOCUMENTS

JP 2021-120782 A 8/2021

\* cited by examiner

*Primary Examiner* — Stephen T. Reed
(74) *Attorney, Agent, or Firm* — Greenblum & Bernstein, P.L.C.

(57) ABSTRACT

A control device comprising a control unit configured to control regular operation based on operation on a first switch detecting operation in two opposing directions and operation on a second switch detecting touch on an object, wherein the control unit performs control such that the regular operation based on operation on the second switch is not performed until a regular time set between first and second times passes after operation on the first switch is detected, wherein the first time is a time in which a cumulative occurrence rate at which unintended touch on the second switch by a user after operation on the first switch occurs becomes 100% in an experiment carried out in advance, and wherein the second time is a time in which an intended touch on the second switch by the user after operation on the first switch is first detected.

6 Claims, 6 Drawing Sheets

CONTROL DEVICE, OPERATIONAL DEVICE, AND SYSTEM

CROSS REFERENCE TO RELATED APPLICATION(S)

This application is based upon and claims benefit of priority from Japanese Patent Application No. 2021-197796, filed on Dec. 6, 2021, the entire contents of which are incorporated herein by reference.

BACKGROUND

The present invention relates to a control device, an operational device, and a system.

In recent years, various devices accepting operations from users have been developed. Many technologies for improving operability have been proposed. For example, JP 2021-120782A discloses a technology for invalidating an operation on a peripheral touch screen of an operator while the operator is being operated. According to the technology, it is possible to reduce a probability of an unintended input on a touch screen being detected when an operation is performed on an operator.

SUMMARY

However, a situation in which an unintended input on a touch screen occurs is not limited to an interval at which an operator is being operated. Therefore, in the technology disclosed in JP 2021-120782A, there is a situation in which an unintended input on a touch screen cannot be inhibited.

Accordingly, the present invention has been devised in view of the foregoing problem and an objective of the present invention is to process an unintended touch by a user more efficiently on a switch detecting a touch by an object.

To solve the above described problem, according to an aspect of the present invention, there is provided a control device comprising a control unit configured to control a regular operation by a control target device based on an operation on a first switch detecting an operation in two opposing directions and an operation on a second switch detecting a touch on an object, wherein the control unit performs control such that the regular operation by the control target device based on the operation on the second switch is not performed until a regular time set between first and second times passes after the operation on the first switch is detected, wherein the first time is a time in which a cumulative occurrence rate at which an unintended touch on the second switch by a user after the operation on the first switch occurs becomes 100% in an experiment carried out in advance, and wherein the second time is a time in which an intended touch on the second switch by the user after the operation on the first switch is first detected.

To solve the above described problem, according to another aspect of the present invention, there is provided an operation device comprising: a first switch configured to detect an operation in two opposing directions; and a second switch configured to detect a touch on an object, wherein control is performed such that that a regular operation by a control target device based on a touch on an object detected by the second switch is not performed until a regular time set between first and second times passes after the first switch detects an operation, wherein the first time is a time in which a cumulative occurrence rate at which an unintended touch on the second switch by a user after the operation on the first switch occurs becomes 100% in an experiment carried out in advance, and wherein the second time is a time in which an intended touch on the second switch by the user after the operation on the first switch is first detected.

To solve the above described problem, according to another aspect of the present invention, there is provided a system comprising: an operation device including a first switch that detects an operation in two opposing directions and a second switch that detects a touch on an object; and a control device configured to control a regular operation by a control target device based on an operation on the first switch and an operation on the second switch, wherein the control device performs control such that the regular operation by the control target device based on the operation on the second switch is not performed until a regular time set between first and second times passes after the operation on the first switch is detected, wherein the first time is a time in which a cumulative occurrence rate at which an unintended touch on the second switch by a user after the operation on the first switch occurs becomes 100% in an experiment carried out in advance, and wherein the second time is a time in which an intended touch on the second switch by the user after the operation on the first switch is first detected.

According to the aspect of the present invention, it is possible to process an unintended touch by a user on a switch detecting a touch by an object more efficiently.

DETAILED DESCRIPTION OF THE EMBODIMENTS

Figure 1:
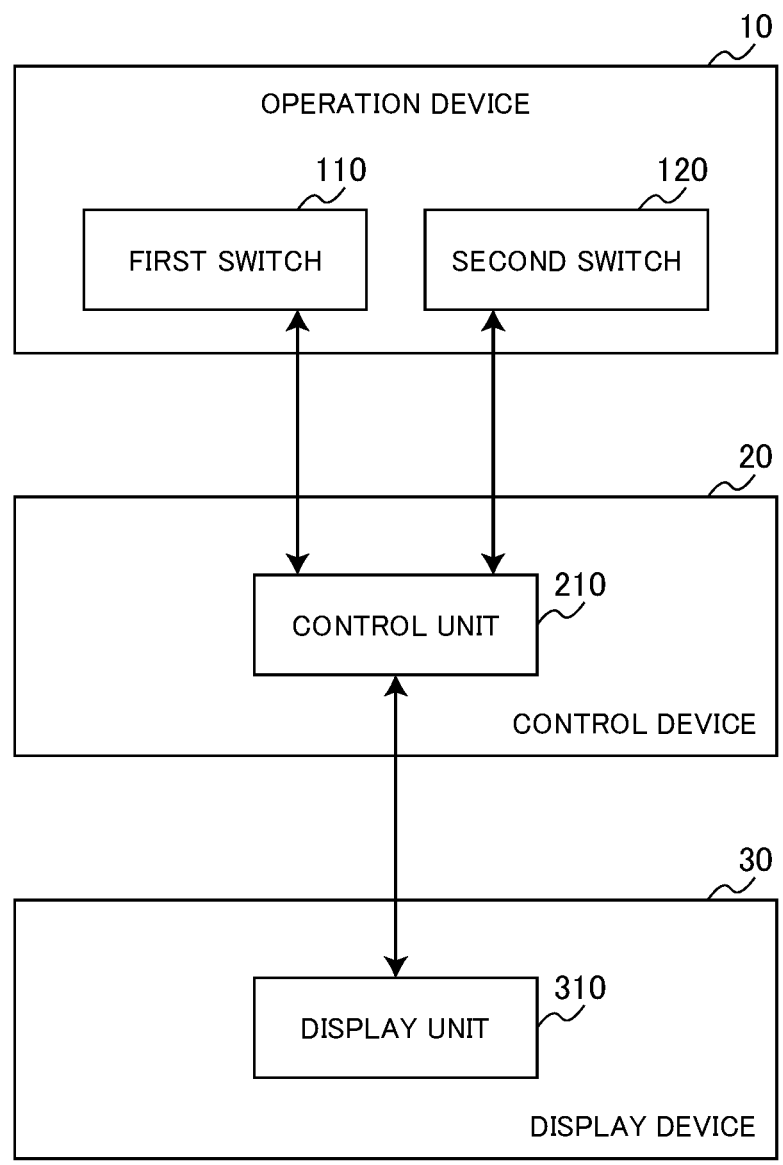
FIG. 1 is a block diagram illustrating an exemplary configuration of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<1. Embodiment>
<<1.1. System Configuration Example>>

First, an exemplary configuration of a system 1 according to an embodiment of the present invention will be described.

FIG. 1 is a block diagram illustrating an exemplary configuration of the system 1 according to an embodiment of the present invention.

As illustrated in FIG. 1, the system 1 according to the embodiment includes an operation device 10, a control device 20, and a display device 30.

Here, the display device 30 is an example of a control target device which is controlled by the control device 20.

(Operation Device 10)

The operation device 10 according to the embodiment is, for example, a device that accepts a user operation on a mobile object such as a vehicle, a ship, an airplane.

As illustrated in FIG. 1, the operation device 10 according to the embodiment includes a first switch 110 and a second switch 120.

The first switch 110 according to the embodiment detects an operation in two opposing directions.

For example, the first switch 110 according to the embodiment may be a thumb-wheel switch, a toggle switch, or the like.

On the other hand, the second switch 120 detects a touch on an object.

For example, the second switch 120 according to the embodiment may be any of various touch panels.

Examples of a scheme of causing the second switch 120 to detect a touch on an object include an electrostatic capacitance scheme, an infrared scheme, and a resistive film scheme.

Figure 2:
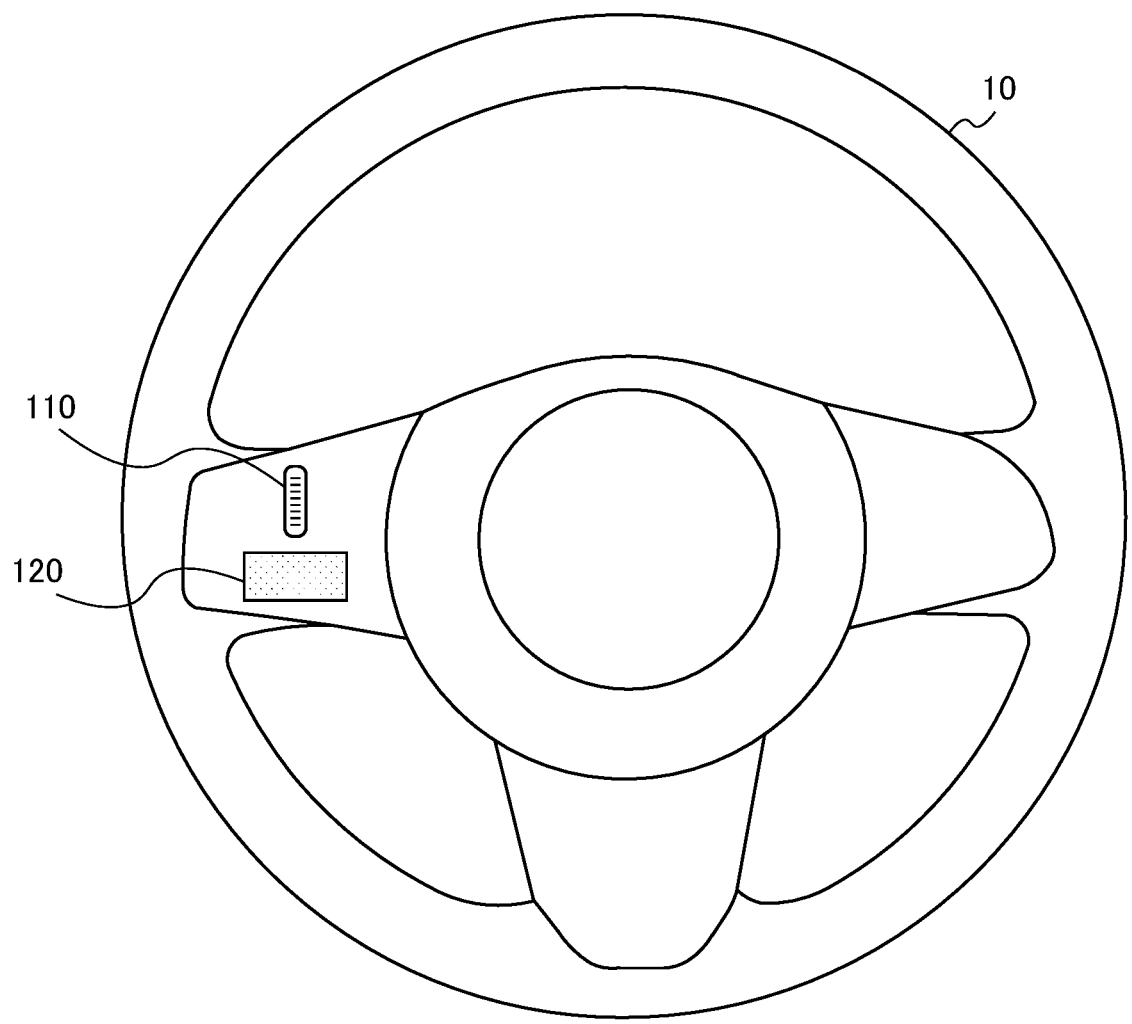
FIG. 2 is a diagram illustrating a disposition example of a first switch 110 and a second switch 120 according to the embodiment.

FIG. 2 is a diagram illustrating a disposition example of the first switch 110 and the second switch 120 according to the embodiment.

As illustrated in FIG. 2, the operation device 10 according to the embodiment may be a steering wheel for performing operation with respect to a movement direction of a mobile object.

In this case, the first switch 110 and the second switch 120 according to the embodiment may be disposed close to each other on a steering wheel.

When the first switch 110 and the second switch 120 are disposed closely, the user is highly likely to touch the second switch 120 unintentionally when the user operates the first switch 110.

As illustrated in FIG. 2, the second switch 120 may be disposed on an extension in an operation direction of the first switch 110.

In the case of an example illustrated in FIG. 2, the first switch 110 is a thumb-wheel switch operated upward or downward and the second switch 120 is disposed below the first switch 110 in the drawing.

As described above, when the second switch 120 is disposed on the extension in the operation direction of the first switch 110, the user has a further higher likelihood of touching the second switch 120 unintentionally when the user operates the first switch 110.

On the other hand, the disposition of the switches illustrated in FIG. 2 is merely exemplary and disposition of the first switch 110 and the second switch 120 according to the embodiment is not limited to the example.

For example, a case in which the second switch 120 is disposed on a grip portion of the steering wheel is assumed.

Even in this case, when the user holding the grip portion operates the first switch 110 disposed at the same position as the position exemplified in FIG. 2 and then holds the grip portion again, the user is likely to touch the second switch 120 unintentionally.

In this way, the second switch 120 according to the embodiment may not necessarily be disposed close to the first switch 110 or may be disposed on a moving line related to an operation of the first switch 110.

The operation device 10 according to the embodiment is not limited to a steering wheel.

For example, the operation device 10 according to the embodiment may be a shift lever mounted on a mobile object.

For example, the operation device 10 according to the embodiment may be a remote controller for remotely operating a mobile object.

An exemplary configuration of the system 1 according to the embodiment will be described continuously with reference to FIG. 1.

(Control Device 20)

The control device 20 according to the embodiment includes a control unit 210 that controls a regular operation by a control target device based on an operation on the first switch 110 and an operation on the second switch 120.

The control unit 210 according to the embodiment has a property in which control is performed such that an operation on the first switch 110 is detected, and then the regular operation by the control target device based on an operation on the second switch 120 is not performed until a regular time passes.

That is, control unit 210 according to the embodiment may consider a touch on an object detected by the second switch 120 to be invalid until the regular time passes after an operation on the first switch 110.

According to the foregoing properties, even in a case in which the user touches the second switch 120 unintentionally and waits when the user attempts to operate the first switch 110, the user can be prevented from performing an unintended operation because the touch is detected.

A function of the control unit 210 according to the embodiment is implemented by any of various processors. The details of the function of the control unit 210 according to the embodiment will be described below.

(Display Device 30)

The display device 30 according to the embodiment is an example of a control target device that performs a regular operation under the control of the control device 20.

As illustrated in FIG. 1, the display device 30 according to the embodiment includes a display unit 310.

The display unit 310 according to the embodiment displays various types of information under the control of the control device 20.

Therefore, the display unit 310 according to the embodiment includes various types of displays or projectors.

Figure 3:
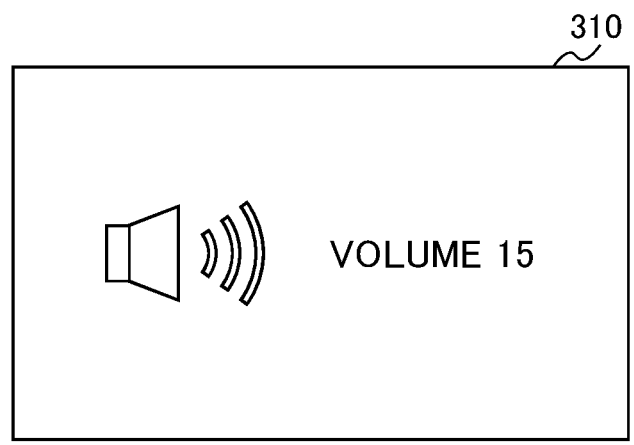
FIG. 3 is a diagram illustrating an example of information displayed on a display unit 310 according to the embodiment.
Figure 3:
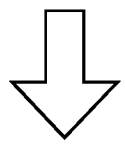
Figure 3:
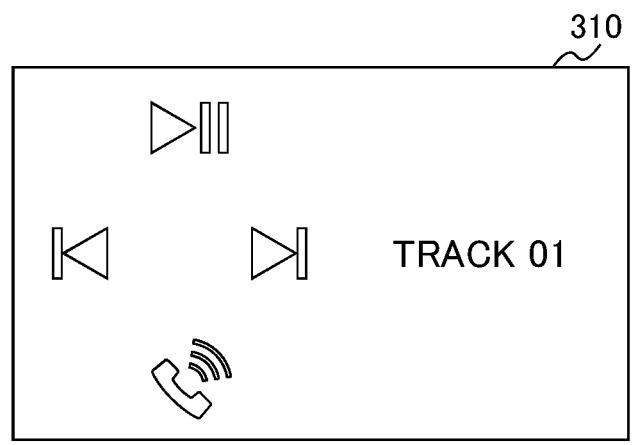

FIG. 3 is a diagram illustrating an example of information displayed on the display unit 310 according to the embodiment.

For example, when the first switch 110 is used to adjust an audio volume, the control unit 210 may determine a change in volume based on an operational amount and a direction in which the first switch 110 is operated and may cause the display unit 310 to display information regarding the changed volume, as illustrated in FIG. 3.

For example, a case in which the second switch 120 is used for an operation of a user interface related to audio reproduction, track selection, execution of a telephone function, and the like is assumed.

In this case, the control unit 210 may cause the display unit 310 to display information including icons corresponding to various functions illustrated in the lower part of FIG. 3 based on detection of a touch on an object by the second switch 120.

Here, in a case in which the control unit 210 does not perform control based on the above-described regular time and the user touches the second switch 120 unintentionally when operating the first switch 110, information illustrated in the lower part of FIG. 3 may be displayed as soon as information illustrated in the upper part of FIG. 3 is displayed.

In the foregoing case, the user cannot just confirm a value of the changed volume visually and an attention of the user may be caught by the abruptly switched information.

The control based on the regular time according to the embodiment is considerably effective in prevention of such a situation.

The display device 30 has been described above as an example of the control target device according to the embodiment.

However, the control target device according to the embodiment is not limited to a display device and the regular operation is not limited to display of information.

For example, the control target device according to the embodiment may be an audio device and the regular operation may be a change in a volume, reproduction/stop, track selection or the like.

The control target device according to the embodiment can be any of various devices performing the regular operation under the control of the control device 20.

<<1.2. Details of Control>>

Next, control by the control unit 210 according to the embodiment will be described in detail.

As described above, the control unit 210 according to the embodiment has the property in which the control is performed such that an operation on the first switch 110 is detected, and then the regular operation by the control target device based on an operation on the second switch 120 is not performed until the regular time passes.

Figure 4:
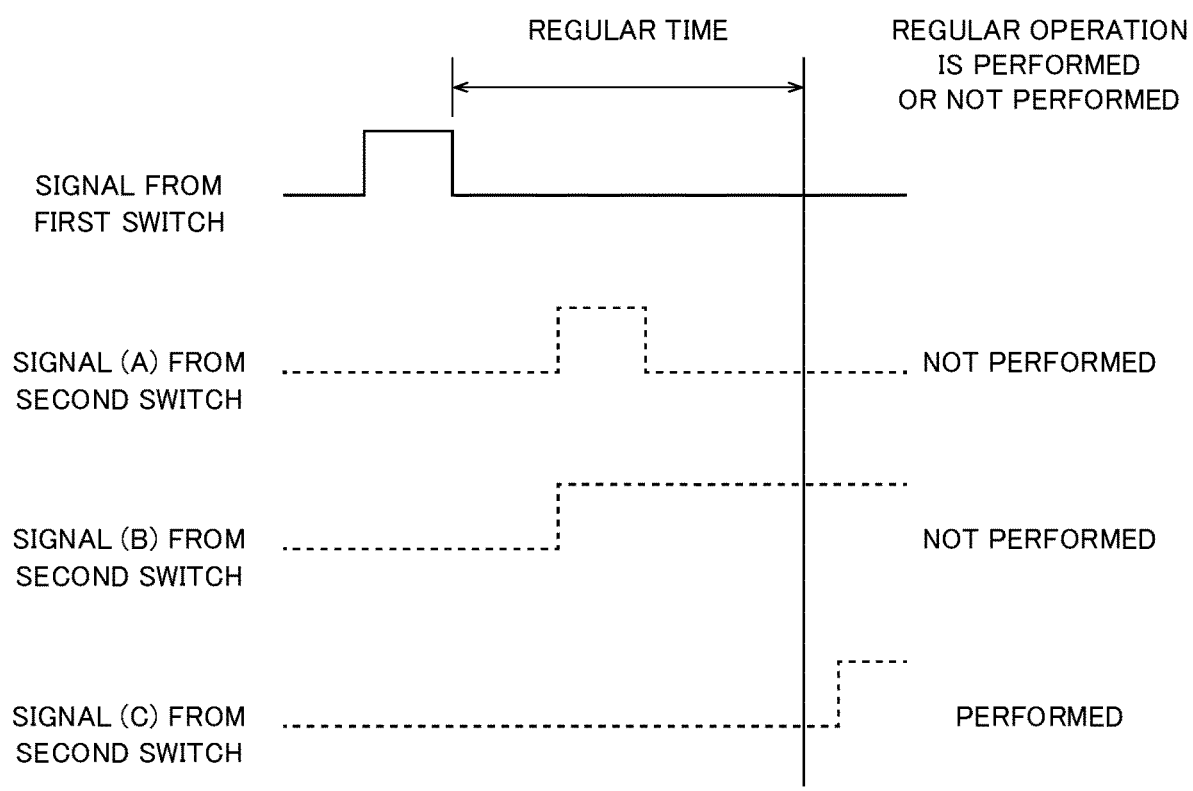
FIG. 4 is a diagram illustrating an example of control by a control unit 210 according to the embodiment.

FIG. 4 is a diagram illustrating an example of control by the control unit 210 according to the embodiment.

In the uppermost part of FIG. 4, a signal from the first switch 110 received by the control unit 210 is exemplified.

In the second to fourth parts of FIG. 4, signals (A) to (C) from the second switch 120 received by the control unit 210 are exemplified.

The signal (A) from the second switch 120 is an example of a signal in a case in which before the first switch 110 finishes detection of a user operation and then the regular time passes, the second switch 120 detects a touch on an object and finishes the detection of the object.

In this case, the control unit 210 causes the control target device not to perform the regular operation based on the signal (A) from the second switch 120.

On one hand, the signal (B) from the second switch 120 is an example of a signal in a case in which before the first switch 110 finishes the detection of the user operation and then the regular time passes, the second switch 120 continues to detect the continuous touch on the object and the regular time passes.

In this case, the control unit 210 causes the control target device not to perform the regular operation based on the signal (B) from the second switch 120.

On the other hand, the signal (C) from the second switch 120 is an example of a signal in a case in which after the first switch 110 finishes the detection of the user operation and then the regular time passes, the second switch 120 detects a touch on the object.

In this case, the control unit 210 causes the control target device not to perform the regular operation based on the signal (C) from the second switch 120.

According to the foregoing control, even in a case in which the user touches the second switch 120 unintentionally and waits when the user attempts to operate the first switch 110, the user can be prevented from performing an unintended operation because the touch is detected.

However, here, when the regular time is not appropriately set, the foregoing advantageous effect cannot be sufficiently obtained or operability is assumed to deteriorate.

For example, when the regular time is considerably short, the advantageous effect of preventing the user from performing an unintended operation is likely not to be sufficiently obtained.

Conversely, when the regular time is considerably long, the regular operation is likely not to be performed even when the user operates the second switch 120 intentionally after the user operates the first switch 110.

To reduce each of the probabilities, the regular time according to the embodiment may be set based on first and second times determined by an experiment carried out in advance.

Figure 5:
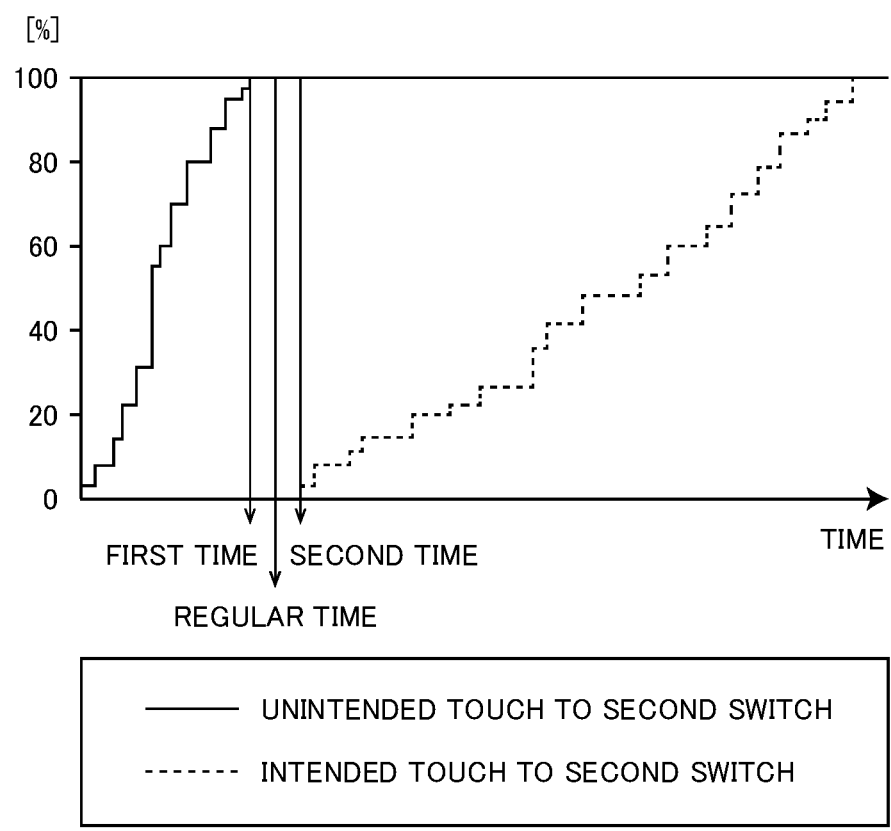
FIG. 5 is a diagram illustrating a regular time set based on first and second times according to the embodiment.

FIG. 5 is a diagram illustrating a regular time set based on the first and second times according to the embodiment.

The experiment according to the embodiment may include first and second experiments.

In the first experiment according to the embodiment, the user is instructed to operate the first switch 110.

The user operates the first switch 110 in accordance with the foregoing instruction.

The operation of the first switch 110 based on the foregoing instruction may be given a plurality of times by a single user or may be given a plurality of times by a plurality of users.

In the first experiment according to the embodiment, when an unintended touch on the second switch 120 by the user occurs after the operation on the first switch 110, an occurrence time of the touch is recorded.

In FIG. 5, a cumulative occurrence rate at which an unintended touch on the second switch 120 by the user occurs in the first experiment is indicated by a solid line.

The first time according to the first embodiment may be a time in which the cumulative occurrence rate is 100%.

That is, in the first experiment according to the embodiment, it can be said that unintended touches on the second switch 120 by the user all occur during the first time.

On the other hand, in the second experiment according to the embodiment, the user is instructed to continue to operate the second switch 120 after the user operates the first switch 110.

The user touches and operates the second switch 120 intentionally after the user operates the first switch 110 in accordance with the foregoing instruction.

The operations of the first switch 110 and the second switch 120 based on the foregoing instruction may be given a plurality of times by a single user or may be given a plurality of times by a plurality of users.

In the second experiment according to the embodiment, a time in which the user touches the second switch 120 intentionally after the operation on the first switch 110 is recorded.

In FIG. 5, a cumulative occurrence rate at which an intended touch on the second switch 120 by the user occurs in the second experiment is indicated by a dashed line.

The second time according to the embodiment may be a time in which an intended touch on the second switch 120 by the user is first detected after the operation on the first switch 110.

That is, in the second experiment according to the embodiment, it can be said that intended touches on the second switch 120 by the user all occur during the second time.

From the foregoing experiment results, the regular time according to the embodiment may be set between the first and second times, as illustrated in FIG. 5.

According to the control based on the regular time set in the way, it is possible to considerably reduce the probability of the regular operation being performed based on an unintended touch on the second switch 120 by the user.

According to the control based on the regular time set in the way, it is possible to considerably improve the probability of the regular operation being correctly performed when the user operates the second switch 120 intentionally after the user operates the first switch 110.

When the experiments according to the embodiment are carried out for a plurality of people, it is possible to set a general regular time which can be applied to more users.

On the other hand, when the experiments according to the embodiment are carried out for a single user, it is possible to set a regular time personalized at least in accordance with operational properties of the user.

From this viewpoint, the control unit 210 according to the embodiment may have a function of giving instructions related to the above-described first and second experiments to a certain user via the display device 30 or the like and automatically setting the first and second times and the regular time.

According to the foregoing function, it is possible to implement control appropriate for an operational property of each user.

<<1.3 Advantageous Effects>>

Next, advantageous effects obtained by the control device 20 according to the embodiment will be described in more detail.

Figure 6:
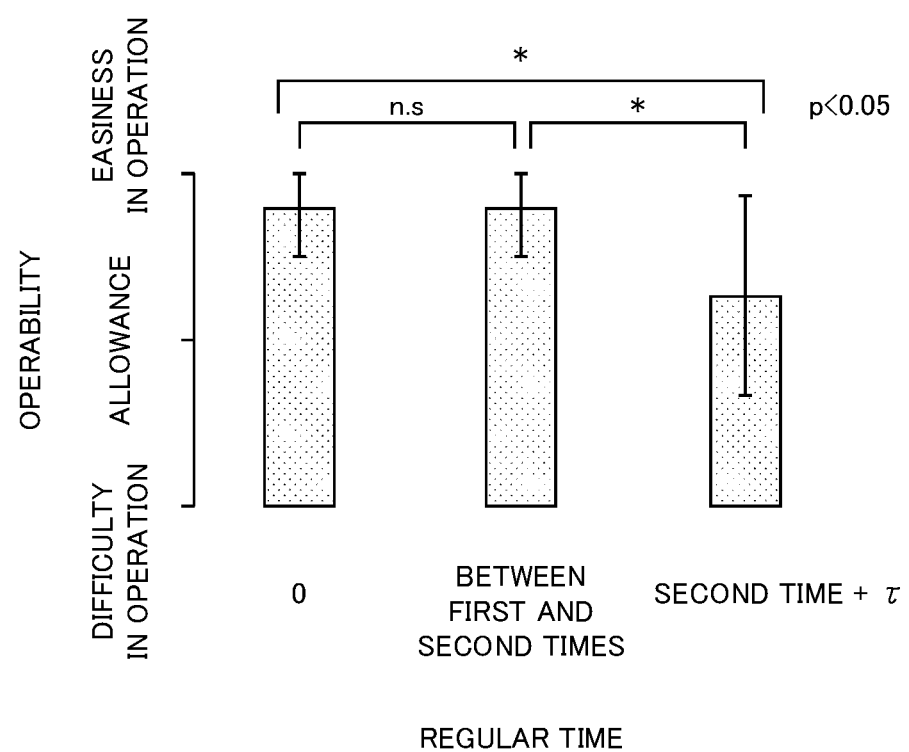
FIG. 6 is a diagram illustrating an advantageous effect accomplished by a control device according to the embodiment.

FIG. 6 illustrates a graph related to an assessment result of the system 1 in which different regular times are set.

In the present assessment, three regular time were set to 0, between the first and second times, and the second time $+\tau$ (fixed time), and each operability was assessed by a plurality of users when the first switch 110 was operated and then the second switch 120 was intentionally operated.

As an assessment standard of the operability, difficulty in an operation, allowance, and easiness in an operation were set step by step.

In the present assessment, as illustrated in FIG. 6, a significant difference in the operability was not acknowledged between when the regular time was set to 0 and when the regular time was set between the first and second times.

The forgoing result shows that when the regular time is set between the first and second times, there is no influence on an intended operation on the second switch 120 after the operation of the first switch 110, that is, a user has no impression that the user does not operate the second switch 120.

From this viewpoint, when the regular time is set between the first and second times, it can be said that the operability does not deteriorate and an unintended touch on the second switch 120 can be invalidated.

On the other hand, when the regular time was set to 0 and the regular time was set to the second time $+\tau$ (fixed time) and when the regular time was set between the first and second times and the regular time was set to the second time $+\tau$ (fixed time), a significant difference was each acknowledged.

It can be said that the forgoing result shows that when the regular time is set to a tie after the second time, this may be a cause of deterioration in the operability, and thus the advantageous effect obtained when the regular time is set between the first and second times is demonstrated.

As described above, the control device 20 according to the embodiment can process an unintended touch on a switch by a user more efficiently, the switch detecting a touch on an object.

<2. Supplements>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

A series of processes by each device described in the present specification may be implemented with a non-transitory computer-readable storage medium on which a program is recorded. Each program is read on a RAM during execution by a computer and is implemented by, for example, a processor such as a CPU. The storage medium is, for example, a magnetic disk, an optical disc, a magneto-optical disc, or a flash memory. The computer program may be delivered via, for example, a network without using the storage medium.

What is claimed is:

1. A control device comprising a control unit configured to control a regular operation by a control target device based on an operation on a first switch detecting an operation in two opposing directions and an operation on a second switch detecting a touch on an object,
   wherein the control unit performs control such that the regular operation by the control target device based on the operation on the second switch is not performed until a regular time set between first and second times passes after the operation on the first switch is detected,
   wherein the first time is a time in which a cumulative occurrence rate at which an unintended touch on the second switch by a user after the operation on the first switch occurs becomes 100% in an experiment carried out in advance, and
   wherein the second time is a time in which an intended touch on the second switch by the user after the operation on the first switch is first detected.

2. The control device according to claim 1, wherein the second switch is disposed close to the first switch on an extension of the first switch in an operation direction.

3. The control device according to claim 1, wherein the first and second switches are disposed on an operation device accepting an operation on a mobile object.

4. The control device according to claim 1, wherein the regular operation by the control target device includes displaying information.

5. An operation device comprising:
   a first switch configured to detect an operation in two opposing directions; and
   a second switch configured to detect a touch on an object,
   wherein control is performed such that that a regular operation by a control target device based on a touch on an object detected by the second switch is not performed until a regular time set between first and second times passes after the first switch detects an operation,
   wherein the first time is a time in which a cumulative occurrence rate at which an unintended touch on the second switch by a user after the operation on the first switch occurs becomes 100% in an experiment carried out in advance, and
   wherein the second time is a time in which an intended touch on the second switch by the user after the operation on the first switch is first detected.

6. A system comprising:
an operation device including a first switch that detects an operation in two opposing directions and a second switch that detects a touch on an object; and
a control device configured to control a regular operation by a control target device based on an operation on the first switch and an operation on the second switch,
wherein the control device performs control such that the regular operation by the control target device based on the operation on the second switch is not performed until a regular time set between first and second times passes after the operation on the first switch is detected,
wherein the first time is a time in which a cumulative occurrence rate at which an unintended touch on the second switch by a user after the operation on the first switch occurs becomes 100% in an experiment carried out in advance, and
wherein the second time is a time in which an intended touch on the second switch by the user after the operation on the first switch is first detected.

* * * * *